(No Model.)

L. R. WITHERELL & M. L. ELDRIDGE.
GATE.

No. 564,676. Patented July 28, 1896.

Witnesses.
Chas Jordan
August Rolff

Inventors.
Loren R. Witherell
Micajah L. Eldridge ic
UNITED STATES PATENT OFFICE.

LOREN R. WITHERELL, OF SEARS, ILLINOIS, AND MICAJAH L. ELDRIDGE, OF DAVENPORT, IOWA.

GATE.

SPECIFICATION forming part of Letters Patent No. 564,676, dated July 28, 1896.

Application filed February 12, 1896. Serial No. 579,094. (No model.)

*To all whom it may concern:*

Be it known that we, LOREN R. WITHERELL, residing at Sears, county of Rock Island, State of Illinois, and MICAJAH L. ELDRIDGE, residing at Davenport, in the county of Scott and State of Iowa, citizens of the United States, have invented a new and useful Gate, of which the following is a specification.

Our invention relates to an improvement in the class of gates known as "tilting gates," or those that are hinged at the lower corner and tilt backward and upward to open instead of swinging on ordinary hinges; and it consists in the application of a coiled spring around the hinge-rod, so that the weight of the gate is always sustained, thus allowing it to be easily opened, either by hand or from the carriage or wagon, by a very simple arrangement of ropes and pulleys. We attain these objects by the mechanism illustrated in the accompanying drawings, in which—

Figure 1:
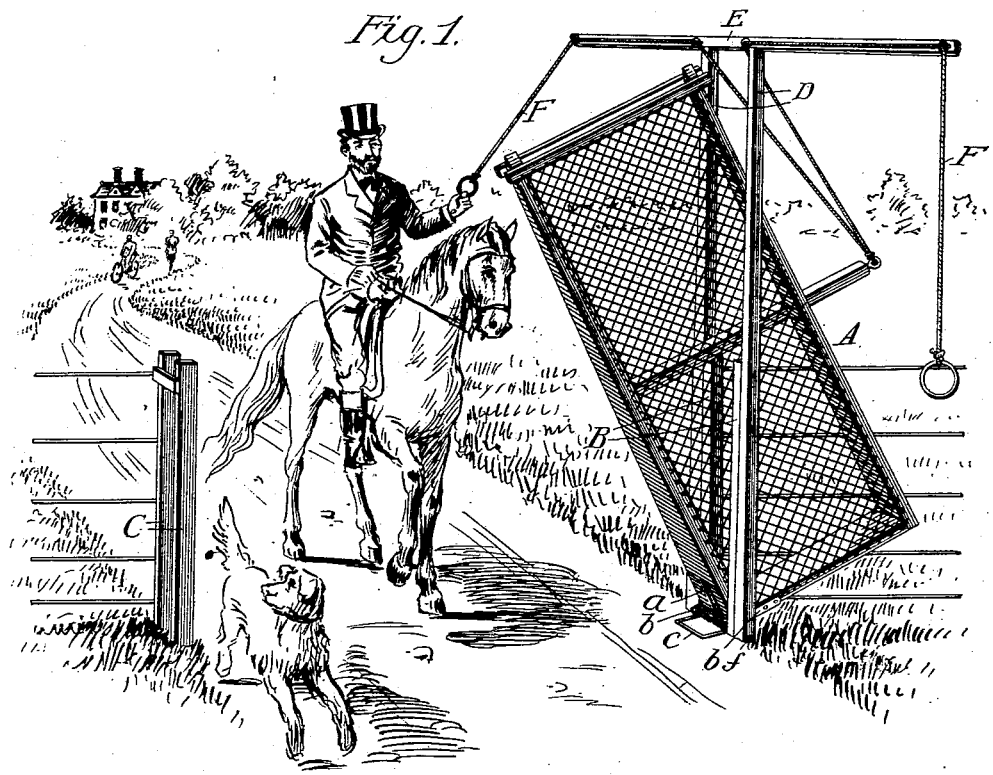
Figure 2:
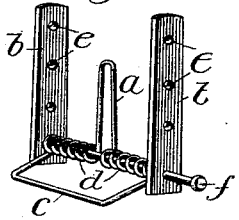

Figure 1 is a perspective view of the gate being opened; and Fig. 2, a detached perspective view of the spring and corner-irons, enlarged.

Similar letters refer to similar parts throughout both views.

The body of the gate A is made of any suitable material, according to the use and location, but for an ordinary front farm-gate we prefer a light frame of wood, widened at the hinge end, so that the gate will have a wide bearing and not sway in the wind and will also come down firmly between the posts C C. We also prefer a wire-netting stretched on the frame, as it is light and strong and offers little resistance to the wind.

The gate is hinged on its lower corner between two substantial posts B B, and if it is desired to make a handy gate to open from the carriage, then the high posts D D, with cross-bar E and ropes F F, are added, as shown in Fig. 1.

The important features of our gate are the hinge-spring $d$ and corner-irons $b$ $b$, whereby the weight of the gate is sustained, so that at all points it is practically deprived of its weight, making it easy to open or close either by hand or by rope and pulley.

The gate is provided with suitable corner-irons $b$ $b$, firmly bolted through the holes $e$ $e$ to the end upright of the gate, and is hinged on the rod $f$.

The spring $d$ is a double-coil spring of the desired strength, one spiral being a right-hand spiral and one a left-hand spiral. The two inner ends of the spiral rods are united in the center to form the lifting-arm $a$, and the outer ends are bent and united in the ground-loop $c$. The spring $d$ is simply held in place by the hinge-rod $f$ passing through the coil, as shown in Fig. 2. The lifting-arm $a$ and ground-loop $c$ are integral parts of the coil-spring $d$. It will be readily seen that this arrangement of the spring is far superior to any system of weights or weighted levers, because the spring sustains the weight of the gate to make the weight practically uniform throughout its entire action while opening and closing, for the reason that the spring is strongest when the gate is closed and is able to sustain greater force of gravity, and as the gate is raised and gravity grows less the spring is growing weaker. So, too, when the gate is started to close down there is little or no pressure of the spring, but when gravity begins to pull down on the gate the spring takes effect and grows stronger, resisting gravity and allowing the gate to close gently instead of falling violently, thereby being a perfect compensating spring, so that a little child can open a heavy gate easily or close the same easily and safely.

Our gate has many good features to recommend it. It is easily opened and closed, as a small child can operate it from the ground or carriage. It is not affected by the wind and never blows shut or open. It can be opened and closed without walking a step. Snow does not interfere with it. It never swags or drags, and does not pull the posts out of place. It can be raised a little to allow hogs and sheep to pass under, and it can be easily and cheaply made to open and close by a single rope on each side. It is especially adapted for large or small city gates, as it does not swing across the sidewalk.

We are aware that prior to our invention gates have been hinged on the corner and operated by ropes, pulleys, and levers. We therefore do not claim such a combination broadly, but What we do claim as our invention, and desire to secure by Letters Patent, is—

5   In a gate the combination of the coiled spring $d$, provided with the lifting-arm $a$, and ground-loop $c$, with the corner-irons $b\ b$, hinge-rod $f$, and gate A, substantially as described.

LOREN R. WITHERELL.
MICAJAH L. ELDRIDGE.

Witnesses:
C. JORDAN,
H. C. BRICELAND.